(12) United States Patent
Augustine et al.

(10) Patent No.: US 7,628,968 B2
(45) Date of Patent: Dec. 8, 2009

(54) HIGH ACTIVITY TITANIA SUPPORTED METAL OXIDE DENOX CATALYSTS

(75) Inventors: Steven M Augustine, Ellicott City, MD (US); Guoyi Fu, Ellicott City, MD (US)

(73) Assignee: Millenium Inorganic Chemicals, Inc., Hunt Valley, MD (US)

( * ) Notice: Subject to any disclaimer, the term of this patent is extended or adjusted under 35 U.S.C. 154(b) by 0 days.

(21) Appl. No.: 12/126,653

(22) Filed: May 23, 2008

(65) Prior Publication Data

US 2008/0247929 A1   Oct. 9, 2008

Related U.S. Application Data

(62) Division of application No. 10/968,706, filed on Oct. 19, 2004, now Pat. No. 7,491,676.

(51) Int. Cl.
| | |
|---|---|
| B01D 53/56 | (2006.01) |
| B01D 53/86 | (2006.01) |
| C01B 21/20 | (2006.01) |
| B01J 21/06 | (2006.01) |
| B01J 23/22 | (2006.01) |
| B01J 23/26 | (2006.01) |
| B01J 23/28 | (2006.01) |
| B01J 23/30 | (2006.01) |
| B01J 23/34 | (2006.01) |
| B01J 23/83 | (2006.01) |
| B01J 23/847 | (2006.01) |
| B01J 23/86 | (2006.01) |
| B01J 23/88 | (2006.01) |
| B01J 23/888 | (2006.01) |
| B01J 23/889 | (2006.01) |

(52) U.S. Cl. ............ 423/239.1; 502/302; 502/303; 502/305; 502/308; 502/309; 502/311; 502/312; 502/313; 502/314; 502/316; 502/319; 502/320; 502/321; 502/322; 502/323; 502/324; 502/325; 502/332; 502/338; 502/349; 502/350; 502/351; 502/353; 502/354; 502/355

(58) Field of Classification Search ............ 502/302, 502/303, 305, 308, 309, 311–314, 316, 319–325, 502/332, 338, 349–351, 353–355; 423/239.1
See application file for complete search history.

(56) References Cited

U.S. PATENT DOCUMENTS 3,279,884 A    10/1966  Nonneinnacher et al.

(Continued)

FOREIGN PATENT DOCUMENTS

EP    0255121    2/1988

(Continued)

OTHER PUBLICATIONS

Alemany et al. reactivity and Physicochemical Characterization of WO3-TiO2 DeNOX Catalysts, *Journ of Catalysts*, 155,117-130 (1995).

(Continued)

*Primary Examiner*—Timothy C Vanoy
*Assistant Examiner*—Serena H. Aldrich
(74) *Attorney, Agent, or Firm*—Dunlap Codding, P.C.

(57) ABSTRACT

The present invention is directed to high activity titanium oxide DeNOx catalysts. In preferred embodiments, by depositing vanadium oxide on a titania supported metal oxide such as tungsten oxide, an improved catalyst may be generated. This catalyst may be used in the treatment of exhaust from sources such as automobiles and industrial plants.

4 Claims, 1 Drawing Sheet

Zeta Potential Measurements from Example 4

U.S. PATENT DOCUMENTS

| | | | |
|---|---|---|---|
| 4,085,193 A | 4/1978 | Nakajima et al. | |
| 4,221,768 A | 9/1980 | Inoue et al. | |
| 4,520,124 A | 5/1985 | Abe et al. | |
| 4,833,113 A | 5/1989 | Imanari et al. | |
| 4,855,115 A * | 8/1989 | Imanari et al. | 423/239.1 |
| 4,916,107 A | 4/1990 | Brand et al. | |
| 4,975,256 A * | 12/1990 | Hegedus et al. | 423/239.1 |
| 5,143,707 A | 9/1992 | Beck et al. | |
| 5,198,403 A | 3/1993 | Brand et al. | |
| 5,292,704 A | 3/1994 | Lester | |
| 5,550,096 A | 8/1996 | Inoue et al. | |
| 5,591,414 A | 1/1997 | Jacob et al. | |
| 5,658,546 A | 8/1997 | Kobayashi et al. | |
| 5,723,404 A | 3/1998 | Butje et al. | |
| 5,753,582 A | 5/1998 | Garcin et al. | |
| 5,907,066 A | 5/1999 | Wachs | |
| 6,380,128 B1 | 4/2002 | Ji et al. | |
| 2001/0004452 A1* | 6/2001 | Mathes et al. | 423/213.2 |
| 2003/0104932 A1 | 6/2003 | Kim | |
| 2003/0186806 A1 | 10/2003 | Steinbrenner et al. | |
| 2006/0084569 A1 | 4/2006 | Augustine et al. | |
| 2007/0140952 A1 | 6/2007 | Inoue et al. | |

FOREIGN PATENT DOCUMENTS

| | | |
|---|---|---|
| GB | 2267905 | 12/1993 |
| JP | 55003872 | 11/1980 |
| JP | 08-229402 | 9/1996 |
| JP | 09-128711 | 6/1999 |
| JP | 12-296580 | 4/2003 |
| WO | WO 2006044768 | 4/2006 |

OTHER PUBLICATIONS

Anstrom, et al., "Density Functional Theory Studies of Mechanistic Asppects of the SCR Reaction on Vanadium Oxide Catalysts," vol. 213, pp. 115-125, Jour of Catalysis (2003).

Deo, et al., "Predicting Molecular Structures of Surface Metal Oxide Species on Oxide Supports under Ambient Conditions," vol. 95, pp. 5889-5895. J Phys. Chem. (1991).

Inomata, et al., "Structures of Supported Vanadium Oxide Catalysts," vol. 87. pp. 754-761, *J. Phys. Chem.* (1983).

Lietti, et al., Characterization and Reactivity of V2O5-MoO3/TiO2, De-NOx SCR Catalysts, *Journ of Catalysts*, vol. 187, No. 2.

Mellor, J.W., "A Comprehensive Treatise on Inorganic and Theoretical Chemistry," vol. XI, pp. 762-763(1931).

Najbar, et al., "Role of Cation Segregation in Formation of V2O5-WO3-TiO2 DeNOX Catalysts," *Solid State Ionics* 101-103 (1997) 707-711.

Parks, George, The Isoelectric Points of Solid Oxides. Solid Hydroxides and Aqueous Hydroxo Complex Systems, 1965, *Chemical Reviews*, 65, pp. 177-197.

\* cited by examiner

Figure 1

Zeta Potential Measurements from Example 4

HIGH ACTIVITY TITANIA SUPPORTED METAL OXIDE DENOX CATALYSTS

CROSS-REFERENCE TO RELATED APPLICATIONS

This application is a division of application Ser. No. 10/968,706, filed Oct. 19, 2004, now U.S. Pat. No. 7,491,676, which is incorporated herein by reference in its entirety.

FIELD OF INVENTION

The present invention relates to catalysts for purifying exhaust gases and waste gases from combustion processes.

BACKGROUND OF THE INVENTION

When burning fossil fuels to produce energy, one typically uses a high temperature combustion process in the presence of air. Unfortunately, this type of process produces both nitrogen oxides (NOx), which are well-known pollutants, and other components that are harmful to health or the environment, such as carbon monoxide and unburned hydrocarbons. Thus, it is important to remove these materials prior to their release into the environment.

There have been many investigations into methods that allow for the removal of these substances. Two methods that are known are combustion modifications and adsorption techniques. Unfortunately, each of these has its disadvantage. The former allows for only limited maximum removal of NOx, and the latter has limited capacity.

A third method for addressing the problem of noxious exhaust gases is catalytic removal, which by comparison, is extremely effective in removing large proportions of unwanted exhaust components and is capable of treating very large volumes of exit gases for long periods of time. In order to effect the reduction of NOx in exhaust gases through catalytic reduction processes, it is necessary either to introduce a reducing agent, such as ammonia, and/or to use the unburned hydrocarbons present in the waste gas effluent. The latter may be more desirable in many applications because it facilitates the combined elimination of two undesirable exhaust components, nitrogen oxides and hydrocarbons, and avoids the introduction of another component into the gas stream.

Although catalytic removal of exhaust gases is common in many industries, the method has unfortunately not been sufficiently optimized. As an example, it is well known that noble metal containing catalysts are effective in the reduction of NOx emissions using either ammonia or hydrocarbons as reducing agents. However, noble metal containing catalysts often have a significant activity for oxidation of sulfur dioxide to sulfur trioxide, and it is well understood that sulfur-containing compounds both adversely affect the performance of noble metal containing catalysts and act as irreversible poisons. It is also known in the art that certain metal oxides used as catalyst supports for noble metals, such as aluminum oxide, are adversely affected by sulfur oxide attack. Thus, many strategies for developing a catalyst are impeded by the undesirable effects of sulfur-based compounds.

As persons skilled in the art are aware, certain work has been done to address the negative effects of sulfur-based compounds. For example, titanium dioxide, particularly that produced in the sulfate process and which contains residual sulfate, has been well investigated because it is now well known to resist sulfate poisoning. Further, it has been reported that the performance of vanadium pentoxide, tungsten trioxide and molybdenum trioxide can be improved by supporting them on titanium dioxide. Still further, increased benefit has been shown to be achievable by forming solid solutions of molybdenum or tungsten oxides with vanadium oxide rather than having them exist independently on the surface or exhibiting distinct phase boundaries between oxides.

However, despite the knowledge of the potential for the use of titania supported vanadium oxide catalysts, none of the known technologies satisfactorily optimize $NO_x$ treatment while avoiding undesirable oxidation of sulfur dioxide. The present invention is directed to developing an improved catalyst to address these issues.

SUMMARY OF THE INVENTION

The present invention is directed to purifying exhaust gases and waste gases from combustion processes. Through the use of this invention, one may remove nitrogen oxides from exhaust streams of stationary sources such as power generating plants or incinerators and of mobile sources such as cars or trucks. The present invention may be used to convert these harmful materials into non-toxic products such as nitrogen and water. Thus, through the use of the present invention, one may economically treat exhaust gases that contain, among other components, oxygen, water, carbon dioxide, and nitrogen oxides. Further, the catalysts of the present invention may allow treatment of the aforementioned substances without oxidizing sulfur dioxide to sulfur trioxide.

In one embodiment, the present invention is directed to a catalyst comprised of titanium oxide, vanadium oxide and a supported metal oxide, wherein said supported metal oxide is selected from the group consisting of oxides of tungsten, molybdenum, chromium, scandium, yttrium, lanthanum, zirconium, hafnium, niobium, tantalum, iron, ruthenium, manganese and mixtures thereof, and is supported on said titanium oxide to form a titania supported metal oxide. The catalyst is formed by depositing vanadium oxide on the titania supported metal oxide. Thus, the vanadium oxide is supported on the titania supported metal oxide and may be in contact with the titania and/or the supported metal oxide. Preferably, the isoelectric point of the surface formed by titania and the supported metal oxide is less than or equal to a pH of 3.75 prior to said depositing.

In another embodiment, the present invention is directed to a catalyst comprised of: (a) anatase titanium dioxide, wherein supported on said anatase titanium dioxide is a supported metal oxide, and wherein said supported metal oxide comprises at least one substance selected from the group consisting of an oxide of tungsten, molybdenum, chromium, scandium, yttrium, lanthanum, zirconium, hafnium, niobium, tantalum, iron, ruthenium, manganese and mixtures thereof; and (b) vanadium oxide, wherein said vanadium has a loading of less than or equal to 1.35% by weight or greater than or equal to 1.8% by weight.

In another embodiment, the present invention is directed to a process for making a titania supported vanadium catalyst, said process comprising combining vanadium oxide with a titania supported metal oxide, wherein the surface formed by said titania and supported metal oxide has an isoelectric point of less than or equal to a pH of 3.75, prior to said combining.

In another embodiment the present invention is directed to a process for forming a catalyst, said process comprising: (a) forming a slurry, wherein said slurry comprises titanium oxide and said slurry has a pH of 2 or lower; (b) adding a metal oxide or a metal oxide precursor to said slurry; (c) obtaining a titania supported metal oxide; and (d) combining said titania supported metal oxide with vanadium oxide.

In another embodiment, the present invention is directed to a process for forming a catalyst, said process comprising: (a) forming a slurry comprised of titanium oxide and a metal oxide or a metal oxide precursor; (b) reducing the pH of the slurry to pH 2 or lower; (c) obtaining a titania supported metal oxide; and (d) combining said titania supported metal oxide with vanadium oxide.

The catalytic material that is produced by the present invention preferably exhibits one or more, if not all of several important characteristics. First, it preferably demonstrates a high activity for the conversion of nitrogen oxides into nitrogen and water over a broad temperature range and at a high gas to solids velocity ratio in an excess of 1,000/hr on a volume basis. Second, it preferably effects this conversion selectively in the presence of oxygen without further oxidizing other components such as sulfur dioxide or ammonia. Third, it preferably is resistant to poisoning or deactivation by sulfur, sulfur oxides or carbon soot. Fourth, it preferably performs well in the presence of water. Finally, it preferably carries out all of these functions for an extended period of time.

For a better understanding of the present invention, together with other and further embodiments, reference is made to the following description taken in conjunction with the examples, the scope of which is set forth in the appended claims.

DETAILED DESCRIPTION

The present invention is directed to improved catalysts, such as a titania supported vanadium oxide catalyst. The catalysts have improved activity for NOx removal and may be used in applications in which the removal of noxious NOx substances is desired.

Definitions

Unless otherwise explicitly indicated or suggested by context, the following terms and phrases have the meanings provided below:

The phrase "isoelectric point" or "IEP" refers to the point at which a particle suspended in a liquid exhibits electric neutrality and is described in terms of the pH value necessary to achieve neutrality. For example, an isoelectric point of 2 means that a particle suspended in water has a net-zero charge when it is in an environment of pH 2.

The term "loading" refers to the weight relationship between the identified material and the system to which it is referenced. For example, in the context of the present invention, when one refers to the loading of vanadium oxide on a catalyst, it is the ratio of the vanadium oxide weight to the total weight of the catalyst, including the titanium oxide, the vanadium oxide and the supported metal oxide.

The phrase "supported metal oxide" refers to a metal oxide that is associated with, rests on or is supported by another substance. Thus, a titania supported metal oxide refers to a substance comprised of titanium oxide (e.g., anatase titanium dioxide), and another metal oxide, wherein the other metal oxide is supported on the titanium oxide. These substances may be associated with each other by chemical bonds, and although not wishing to be bound by any one theory, it is speculated that the metals are connected through oxide bridges, e.g., Ti—O—W. The phrase "supported metal oxide" is to be understood to include supported simple metal oxides such as tungsten oxide, as well as supported mixed metal oxides. Similarly, an oxide of tungsten refers to both simple oxides and mixed metal oxides that comprise tungsten.

The phrase "zeta potential" refers to the potential difference produced at a solid-liquid interface due to ions absorbed from the fluid solution. The zeta potential can be controlled by the addition of suitable ions so as to produce or to prevent flocculation. The ions may be added by a number of means, including but not limited to, manipulating pH. The pH value at which the zeta potential is zero, is the isoelectric point.

PREFERRED EMBODIMENTS

According to a first embodiment, the present invention is directed to a catalyst comprised of titanium oxide, vanadium oxide, and a supported metal oxide.

Preferably, the titanium oxide is anatase titanium dioxide. Preferably, the supported metal oxide is selected from the group consisting of oxides of tungsten, molybdenum, chromium, scandium, yttrium, lanthanum, zirconium, hafnium, niobium, tantalum, iron, ruthenium, manganese and mixtures thereof. More preferably, the supported metal oxide comprises tungsten or molybdenum or their mixture. Most preferably, the supported metal oxide comprises tungsten. The supported metal oxide is supported on the titanium oxide and forms a titania supported metal oxide. Other substances may be used in conjunction with the aforementioned substances if those other substances do not raise the isoelectric point to undesirable levels and do not undesirably interfere with the performance of the catalyst product. For example, it may be advantageous to incorporate zirconium oxide into a titanium oxide lattice at a loading of between 10 wt. % and 20 wt. %.

The catalyst of this embodiment is formed by depositing the vanadium oxide on the titania supported metal oxide. Preferably, the titania supported metal oxide has an isoelectric point of less than or equal to a pH value of 3.75 prior to the depositing of the vanadium oxide. More preferably, the isoelectric point is less than or equal to a pH value of 2.75. Most preferably, the isoelectric point is less than or equal to a pH value of 2. The parameter of the isoelectric point refers to a measurement of the titania supported metal oxide were that substance's isoelectric point tested immediately prior to placing the titania supported metal oxide in the environment in which vanadium oxide will become deposited on the titanium supported metal oxide. Thus, it refers to a measurement of the titania supported metal oxide as a previously dry material slurried in water and prior to, for example being placed into a solution into which the vanadium oxide will be added.

Preferably, the loading of the supported metal oxide is less than or equal to 20% by weight, more preferably less than or equal to 15% by weight, and most preferably less than or equal to 10% by weight of the resulting catalyst that comprises the titania supported metal oxide and the vanadium oxide. Preferably, the loading of the vanadium oxide is either less than or equal to 1.35% by weight or greater than or equal to 1.8% by weight. More preferably, the loading of the vanadium oxide is either less than or equal to 1.0% by weight or greater than or equal to 2.7% by weight. As a matter of practical limitations, the upper limit of the loading of the vanadium oxide is about 10% by weight.

Additionally, it should be noted that one could generate an improved catalyst even without the addition of vanadium if the isoelectric point is manipulated as described above. Thus, a titania supported metal oxide material that has an isoelectric point as provided above, demonstrates improved catalytic function even absent vanadium. However, preferably, the vanadium oxide is included.

According to a second embodiment, the present invention is directed to a catalyst that comprises anatase titanium dioxide, a supported metal oxide and vanadium oxide. According to this embodiment, the supported metal oxide comprises at least one substance selected from the group consisting of tungsten molybdenum, chromium, scandium, yttrium, lanthanum, zirconium, hafnium, niobium, tantalum, iron, ruthenium, and manganese or mixtures thereof. Preferably, the substance is tungsten. Further, according to this embodiment, the vanadium oxide has a loading of less than or equal to 1.35% by weight or greater than or equal to 1.8% by weight. As with the first embodiment, the upper limit of vanadium oxide is about 10% by weight.

More preferably, the vanadium oxide has a loading of less than or equal to 1.0% by weight or greater than or equal to 2.7% by weight. Additionally, preferably the supported metal oxide has a loading of less than or equal to 20% by weight, more preferably less than or equal to 15% by weight, and most preferably less than or equal to 10% by weight.

According to a third embodiment, the present invention is directed to a process for making a titania supported vanadium catalyst. This process comprises combining vanadium oxide (or a vanadium oxide precursor that is transformed into a form suitable for depositing) with a titania supported metal oxide. At the time of combining, the titania supported metal oxide in its solid form has an isoelectric point of preferably less than or equal to a pH of 3.75, more preferably less than or equal to a pH of 2.75, and most preferably less than or equal to a pH of 2, prior to being placed in an environment in which it will be combined with the vanadium oxide.

The titania supported metal oxide of this embodiment, as well as of the other embodiments of the present invention may be formed by combining a titanium oxide, such as anatase titanium dioxide, with a metal oxide or metal oxide precursor. Metal oxide precursors are substances that can become metal oxides suitable for being supported on a titanium oxide. Examples of metal oxide precursors include but are not limited to ammonium paratungstate, ammonium metatungstate, potassium tungstate, sodium tungstate, metatungstic acid, ammonium paramolybdate, potassium molybdate, sodium molybdate, molybdenum oxydichloride, potassium chromate, sodium chromate, metal acetate like chromium (III) acetate, metal nitrate like chromium (III) nitrate, metal sulfate like manganese (II) sulfate and metal tartate like manganese (II) tartate.

In order to generate a titania supported metal oxide with the desired isoelectric point, one of two basic processes can be used. According to one method, the titanium oxide can be slurried in for example, water, and then combined with acid to form a slurry with a pH that will ensure the desired isoelectric point. The metal oxide or metal oxide precursor can then be added to the acidic slurry. Optionally, the metal oxide or metal oxide precursor can be combined with water or other suitable substance prior to adding it to the acidic slurry. According to a second method, the titania and metal oxide or metal oxide can be combined in a slurry prior to lowering of the pH. Unless otherwise specified or indicated by context, the terms "slurry" and "solution" are used interchangeably and include solutions, suspensions and slurries, as well as any other combination of substances as liquid or colloidal media.

Regardless of the method, preferably, the conditions under which the titanium oxide and the metal oxide or metal oxide precursor are combined are such that the temperature is effective to dissolve the metal oxide or metal oxide precursor so that it may be in a form that may be mixed with the titanium oxide. By way of example, for dissolution of ammonium paratungstate, preferably, the temperature is at least 30° C., more preferably at least 40° C., and most preferably at least 50° C. Methods for determining the temperatures at which dissolution occurs are well known to persons of ordinary skill in the art, and will in part depend on the composition of the metal oxide precursor, and the composition and concentration of the acid. Optionally, one may add sulfate ions to the slurry or solution. By adding sulfate ions, one may facilitate the manipulation of the isoelectric point to the desired level such as those described above. The phrase "adding sulfate ions" refers to the direct addition of sulfate ions, as well as to the addition of salts or acids that would form the desired ions after entering the slurry or solution.

Preferably, one mixes the resulting slurry to which the titanium oxide, the metal oxide precursor and the acid were added in order to allow for as thorough a distribution of the metal oxide on the titania as possible. Methods for mixing are well known to persons skilled in the art and include but are not limited to using the following apparatuses: a heated stir plate, rotary evaporator, or a round bottom flask warmed with a heating mantle and stirred with a Heidolph direct drive mixer.

Following mixing, the slurry may be filtered, dried and calcined. Methods for filtering, drying and calcining are well known to persons of ordinary skill in the art. For the drying of this material, any temperature that is effective for removing moisture may be used. Preferably, greater than 95%, more preferably greater than 98% and most preferably all moisture is removed. For example, the temperature may be 100° C. or greater. During calcining of tungsten oxide or its equivalent on titanium oxide, preferably the temperature is greater than 150° C., more preferably between 350° C. and 600° C., even more preferably between 450° C. and 550° C., and most preferably between 480° C. and 520° C. When operating within each of the ranges, preferably one maximizes the time in the upper half of the denoted temperatures, i.e. greater than or equal to 500° C. As persons skilled in the art are aware, with respect to calcinations, the upper end of a preferred temperature range is often defined by the practical of economic limitations of a calcining device. Thus, if a sufficiently efficient calcining apparatus is used, one may choose to calcine at a temperature greater than 500° C. that exceeds the above-denoted upper limitations. The time necessary for drying and calcining, in part, depends on the temperature for each stage. The above described process results in the formation of the titania supported metal oxide.

The titania supported metal oxide may then be combined with vanadium oxide. The vanadium oxide is preferably in the form of a solution when combined with the titania supported metal oxide. Further, preferably prior to combination with the titania supported metal oxide catalysts, a highly alkaline ligand such as monoethanolamine is used to dissolve vanadium pentoxide in water. Other potential ligands include diethanolamine and triethanolamine along with citric and tartaric acids. Alternatively, other substances such as acids, including oxalic acid may be used to facilitate dissolution.

The resulting solution may be mixed with the titania supported metal oxide, and following mixing, solvent may be evaporated. Techniques for evaporation are well known to persons of ordinary skill in the art, and include but are not limited to conditions in which one uses a vacuum. The remaining powder may then be dried and calcined. For the drying of this material, any temperature that is effective for removing moisture may be used. Preferably, greater than 95%, more preferably greater than 98% and most preferably all moisture is removed. For example, in many applications the temperature may be 60° C. under vacuum or greater. During calcining preferably the temperature is between 500° C. and 700° C., more preferably between 550° C. and 650° C., and most preferably between 580° C. and 620° C. When operating within each of the ranges, preferably one maximizes the time in the upper half of the denoted temperatures, i.e. greater than or equal to 600° C. As persons skilled in the art are aware, with respect to calcinations, the upper end of a preferred temperature range is often defined by the practical of economic limitations of a calcining device. Thus, if a sufficiently efficient calcining apparatus is used, one may choose to calcining at a temperature greater than 600° C. that exceeds the above-denoted upper limitations. During this process, the vanadium oxide becomes deposited on the titania supported metal oxide and becomes associated with the titania supported metal oxide. Although not wishing to be bound by any one theory, it is postulated that the vanadium bonds to the titania and/or supported metal oxide such as oxides of tungsten, through oxide bridges.

The amount of titanium oxide, metal oxide precursor and vanadium oxide to use in this process will be determined by the amount desired in the final product. Preferably, the amount of these ingredients is sufficient to generate a product with the loadings described above for the first and second embodiments.

Examples of acids that may be used include, but are not limited to sulfuric acid and nitric acid. Preferably, the acid lowers the pH to less than or equal to 5, more preferably less than or equal to 3 and most preferably less than or equal to 2. The preferred amount of acid will depend on both its concentration and the amount of slurry to which it is being added, and persons of ordinary skill in the art will be able to determine the correct volume.

The process of the third embodiment may be used to produce the catalysts of the first and second embodiments. These catalysts may be used in diverse applications in which one wishes to remove NOx and other noxious substances. Additionally, these catalysts may be used in connection with reducing agents such as ammonia and/or relying on the presence of hydrocarbons to act as reducing agents.

Under one particularly preferred embodiment, the present invention is directed to a catalyst formed by a process comprising forming a titania supported metal oxide and associating the titania supported metal oxide with vanadium oxide. According to this embodiment, ammonium paratungstate is dissolved in water at a temperature of at least 50° C. This solution is combined with titania, preferably anatase titanium dioxide, to form a slurry.

The slurry is formed under conditions sufficient to reach a pH of less than 2, more preferably, approximately pH 0. (A pH of approximately 0 refers to a pH that is less than pH 0.2, but due to practical and/or economic constraints, one may not be able to reduced it to 0.) The reduction of pH may be accomplished, for example, by adding acid and/or sulfate ions. From this slurry, the tungsten oxide and titania are recovered, by for example, filtering. These substances are then subjected to washing, drying at a temperature of greater than 100° C., and calcining at a temperature of greater than 500° C. for at least six hours, to form a titania supported metal oxide. Preferably, this titania supported metal oxide has an isoelectric point of less than or equal to a pH of 2.

The titania supported metal oxide is then combined with a solution comprised of vanadium oxide or a vanadium oxide precursor dissolved in monoethanolamine and water. The components (the titania supported metal oxide and vanadium oxide) are filtered, washed, dried first at a temperature of at least 60° C. in a rotary evaporator, then at a temperature of at least 100° C. for at least six hours, preferably, eight hours and calcined at a temperature of at least 600° C. for at least six hours.

The amount of ammonium paratungstate and vanadium oxide used are preferably sufficient to generate a product with loadings of approximately 8-10 wt. % tungsten and approximately 0.7-0.9% vanadium.

According to another embodiment, one may remove NOx by exposing the exhaust gas to a catalyst of or made by the present invention. The catalysts of the present invention may for example, be coated on a monolith support such as cordierite. The catalysts may also be formed in a self-supporting monolith. In either case the resulting materials should preferably have surface areas of 40 to 200 $m^2/g$ and pore volumes of 0.1 to 1.0 ml/g. These catalysts may, for example, be incorporated into automobile or industrial plant waste streams.

EXAMPLES

The present invention is illustrated by the following examples. These are merely illustrative and should not be construed as limiting the scope of the invention.

Accompanying the examples are tables that summarize certain results. In the tables, "k*tau" represents the activity constant multiplied by the contact time. As persons of ordinary skill are aware, this is related to the assumption that ammonia selective catalytic reduction is first order with respect to NO and zero order with respect to ammonia. Therefore, the activity is calculated from conversion as k*tau=−ln (1−conversion) where conversion is represented as a fraction of 1. One problem with using conversion as a measurement is that only as much NO as is present can be converted, so the maximum value is 1. As 1 is approached, it takes a lot more activity to make small changes. Calculating k*tau helps to correct for this. The most accurate measure of activity is k*tau as long as tau is constant, which is true for the examples below. Additionally, in the examples below, the ammonia selectivity was 100%.

Comparative Example 1

No Manipulation of Isoelectric Point 0.185 g monoethanolamine, 20 ml deionized water and 0.092 g $V_2O_5$ are mixed in a 25 ml flask at 60° C. until dissolution of vanadium oxide. Then 10 g of commercially available 10 wt. % $WO_3$ supported on anatase $TiO_2$ (Trade name DT52 from Millenium Inorganic Chemicals, Inc., Baltimore, Md.) is stirred in the solution. The solvent is evaporated under vacuum, and the powder is dried at 110° C. over night. The sample is then calcined at 600° C. for 6 hrs. The final $V_2O_5$ loading is 0.9 wt. %. The results of activity testing are shown in Table 1 under k*tau.

TABLE 1

Results from Comparative Examples 1 & 2 and Examples 1-5

| Sample | Trial | Metal Oxide | $V_2O_4$ Loading (wt. %) | pH | Acid | Powder | IEP (pH) | Conversion at 270° C. (%) | k*tau |
|---|---|---|---|---|---|---|---|---|---|
| Comparative Example 1 | 1 | $WO_3$ | 0.9 | | | DT52 | 4.1 +/− 0.25 | 39 | 0.494 |
| | 2 | $WO_3$ | 0.9 | | | DT52 | 4.1 +/− 0.25 | 36.7 | 0.457 |
| | 3 | $WO_3$ | 0.9 | | | DT52 | 4.1 +/− 0.25 | 35.4 | 0.437 |
| | 4 | $WO_3$ | 0.9 | | | DT52 | 4.1 +/− 0.25 | 43.9 | 0.578 |
| | 5 | $WO_3$ | 0.9 | | | DT52 | 4.1 +/− 0.25 | 48.9 | 0.671 |
| | 6 | $WO_3$ | 0.9 | | | DT52 | 4.1 +/− 0.25 | 40.7 | 0.523 |
| Comparative Example 2 | 1 | $WO_3$ | 0.9 | | | DT52 | 3.65 | 44.9 | 0.596 |
| Example 1 | 1 | $WO_3$ | 0.9 | 0 | $H_2SO_4$ | DT51 | <2 | 75.9 | 1.42 |
| | 2 | $WO_3$ | 0.9 | 0 | $H_2SO_4$ | DT51 | <2 | 76.4 | 1.44 |
| | 3 | $WO_3$ | 0.9 | 0 | $H_2SO_4$ | DT51 | <2 | 74.9 | 1.38 |
| | 4 | $WO_3$ | 0.9 | 0 | $H_2SO_4$ | DT51 | <2 | 72.4 | 1.29 |
| | 5 | $WO_3$ | 0.9 | 0 | $H_2SO_4$ | DT51 | <2 | 70.7 | 1.23 |
| | 6 | $WO_3$ | 0.9 | 0 | $H_2SO_4$ | DT51 | <2 | 74.7 | 1.37 |
| Example 2 | 1 | $WO_3$ | 0.9 | 0 | $H_2SO_4$ | DT51 | 2.03 | 61.1 | 0.944 |
| Example 3 | 1 | $WO_3$ | 0.9 | 2 | $H_2SO_4$ | DT51 | <2 | 73.3 | 1.32 |
| | 2 | $WO_3$ | 0.9 | 2 | $H_2SO_4$ | DT51 | <2 | 79.3 | 1.58 |
| | 3 | $WO_3$ | 0.9 | 2 | $H_2SO_4$ | DT51 | <2 | 70.2 | 1.21 |
| Example 5 | 1 | $WO_3$ | 0.9 | 0 | $HNO_3$ | DT51 | <2 | 70 | 1.2 |
| | 2 | $WO_3$ | 0.9 | 0 | $HNO_3$ | DT51 | <2 | 75.1 | 1.39 |
| Example 6 | 1 | $MoO_3$ | 0.9 | 0 | $H_2SO_4$ | DT51 | NM | 69.6 | 1.19 |

Comparative Example 2

Reducing pH After Tungsten Oxide is Supported on Titania 75 g DT52 is slurred in 175 ml deionized water and the pH is lowered to 0 by the addition of concentrated sulfuric acid. The powder is filtered, dried at 110° C. overnight and calcined at 500° C. for 6 hrs. Vanadium oxide is added to this sample in the same manner as that described in Comparative Example 1. The results of activity testing are shown in Table 1.

Example 1

Reducing pH Prior to Addition of APT to Mamipulate Isoelectric Point 75 g of anatase $TiO_2$ containing no tungsten oxide (Trade name DT51 from Millennium Inorganic Chemicals, Inc.) is slurried in 175 ml deionized water. Concentrated sulfuric acid is added until the pH of the slurry reaches 0. A separate solution of ammonium paratungstate (APT) was prepared by dissolving 9.38 g in 150 ml deionized water at 50° C. The APT solution is added to the $TiO_2$ slurry and allowed to mix for 1 hr. The powder is then filtered, dried at 110° C. over night and calcined at 500° C. for 6 hrs. The amount of tungsten added was sufficient to achieve a 10 wt. % loading of $WO_3$. Vanadium oxide is added to this sample in the same manner as that described in Comparative Example 1. The results of activity testing are shown in Table 1.

Example 2

Reducing pH After Addition of APT, But Prior to Depositing of APT on Titania

In order to show that the order of the process is important, the point in the method where the pH is dropped and the APT is added is reversed from Example 1. The following method is used: 75 g of DT51 is slurried in 175 ml deionized water. A separate solution of ammonium paratungstate (APT) was prepared by dissolving 9.38 g in 150 ml deionized water at 50° C. The APT solution is added to the $TiO_2$ slurry, and then concentrated sulfuric acid is added until the pH of the slurry reaches 0. the powder is then filtered, dried at 110° C. over night and calcined at 50° C. for 6 hrs. The amount of tungsten added was sufficient to achieve a 10 wt. % loading of $WO_3$. Vanadium oxide is added to this sample in the same manner as that described in Comparative Example 1. The results of activity testing are shown in Table 1. As the results in Table 1 show as measured by the k*tau parameter, products made accordingly to this process show improvement relative to the products of the comparative examples. However, these products are not as highly performing as those made according to Example 1.

Example 3

Reducing pH to 2

The 10 wt. % $WO_3$ on $TiO_2$ sample was prepared in the same manner as that described in Example 1 with the exception that the pH is lowered to 2 with the addition of concentrated sulfuric acid. Vanadium oxide is added to this sample in the same manner as that described in Comparative Example 1. The results of activity testing are shown in Table 1.

Example 4

Activity Versus Zeta Potential

Figure 1:
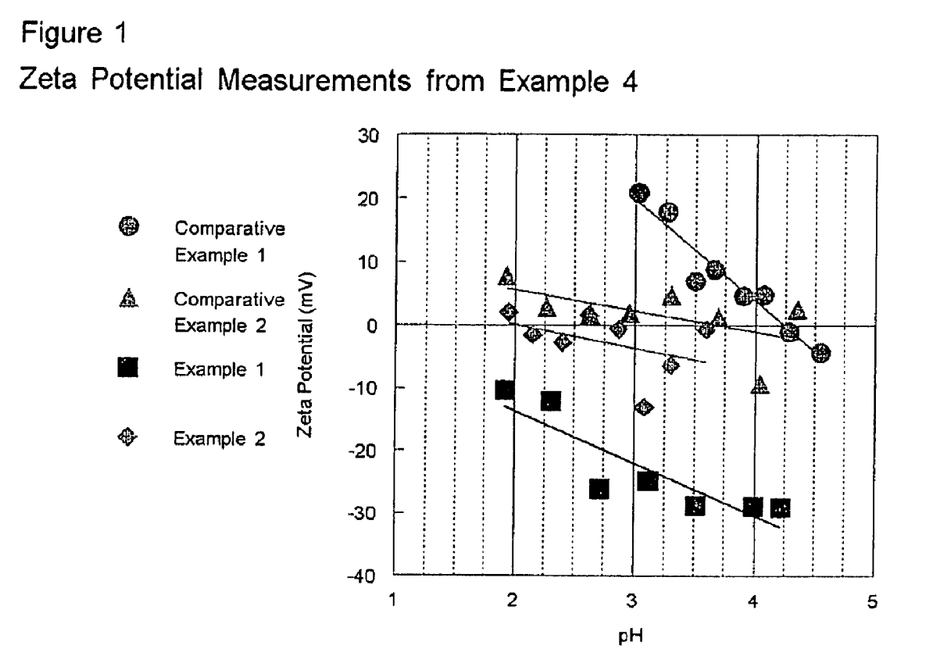
FIG. 1 is a representation of zeta potential measurements from certain catalysts of the present invention, as well as from certain comparative examples.

The improvement from the treatments of the present invention is due to the charge surrounding the powder particle in a liquid medium as the vanadium pentoxide is deposited. It appears from these results that this charge should be as negative as possible to effect high activity at low vanadium pentoxide loadings. To show the effect of this treatment on the surface charge in an aqueous medium, zeta potential measurements were done using a Malvern Zetasizer 3000HSA. The instrument measures changes in powder mobility in water when subjected to an electric field as the pH of the system is varied. The powder is slurried in water with 0.01 M $KNO_3$ at very dilute concentrations to form a faintly cloudy dispersion. The samples are then placed in the instrument, which automatically titrates the slurry to higher pH using 0.25 M KOH or to lower pH using 1.0 M HCl. At various points in the titration, the instrument measures the powder mobility using light scattering methods. The zeta potential measurements as a function of slurry pH are shown in FIG. 1. A line is drawn through the points to approximate the function, and the point at which the line crosses 0 is termed the isoelectric point of the powder. The results of the determination are placed in Table 1. They show that the activity increases as the zeta potential decreases. The decrease in zeta potential can be represented by a decrease in isoelectric point. The least active material shows the highest isoelectric point of the group. The most active has the lowest zeta potential measurements. Indeed, the isoelectric point of the most active catalyst cannot be determined accurately, because the line crosses 0 below pH 2, which is the physical limitation of the instrument.

Example 5

Use of Nitric Acid

To show that this preparation is not limited to sulfuric acid for lowering pH, the 10 wt. % $WO_3$ on $TiO_2$ sample was prepared in the same manner as that described in Example 1 with the exception that the pH is lowered to 0 by using nitric rather than sulfuric acid. Vanadium oxide is added to this sample in the same manner as that described in Comparative Example 1. The results of activity testing are shown in Table 1.

Example 6

Use of Molybdenum

To show that this preparation is not limited to tungsten, a 10 wt. % molybdenum on $TiO_2$ sample was prepared as that described in example 1 with the substitution of ammonium paramolybdate for ammonium paratungstate. Vanadium oxide is added to this sample in the same manner as that described in Comparative Example 1. The results of activity testing are shown in Table 1.

Example 7

Comparison of Isoelectric Points

To show that the activity of the catalyst shows strong inverse correlation with measured isoelectric point prior to vanadium deposition, four catalysts were prepared in such a way to vary their isoelectric point from pH values of 2.41 to 3.92. Vanadium oxide is added to these samples in the same manner as that described in Comparative Example 1. The results of the activity tests show that each successive decrease in isoelectric point is accompanied by a successive increase in activity in Table 2 below.

TABLE 2

Results from Example 7

| Sample | IEP (pH) | Conversion at 270° C. (%) | k*tau |
|---|---|---|---|
| Example 7a | 2.41 | 74.5 | 1.37 |
| Example 7b | 3.06 | 68.4 | 1.15 |
| Example 7c | 3.43 | 65.5 | 1.06 |
| Example 7d | 3.92 | 61.6 | 0.957 |

Example 8

Vanadium Loading

The improvement in relative activity is a function of vanadium loading. This is shown in Table 3 where the tungsten is deposited on DT51 as described in Example 1, and the vanadium oxide is added to these samples in the same manner as that described in Comparative Example 1. This table shows that the effect of the improved preparation method is apparent at vanadium pentoxide loadings less than or equal to 1.35 wt. % and greater than or equal to 1.8 wt. %.

TABLE 3

Results from Example 8

| Sample | $V_2O_5$ Loading (wt. %) | pH | Powder | IEP (pH) | Conversion at 270° C. (%) | k*tau |
|---|---|---|---|---|---|---|
| Comparative Example 8a | 0.9 | | DT52 | 4.1 +/− 0.25 | 41.6 | 0.538 |
| Comparative Example 8b | 1.35 | | DT52 | 4.1 +/− 0.25 | 67 | 1.11 |
| Comparative Example 8c | 1.8 | | DT52 | 4.1 +/− 0.25 | 77.7 | 1.5 |
| Comparative Example 8d | 2.7 | | DT52 | 4.1 +/− 0.25 | 62.4 | 0.979 |
| Comparative Example 8e | 3.6 | | DT52 | 4.1 +/− 0.25 | 68.9 | 1.17 |
| Example 8a | 0.9 | 0 | DT51 | <2 | 62.2 | 0.974 |
| Example 8b | 1.35 | 0 | DT51 | <2 | 69.9 | 1.2 |
| Example 8c | 1.8 | 0 | DT51 | <2 | 75.7 | 1.41 |
| Example 8d | 2.7 | 0 | DT51 | <2 | 68.6 | 1.16 |
| Example 8e | 3.6 | 0 | DT51 | <2 | 87.8 | 2.10 |

Example 9

Effect of Calcination

In order to show that the isoelectric point can be lowered with a corresponding increase in measured activity that can be facilitated by an increased calcination temperature, the powder in Comparative Example 1 is calcined at 500° C. for 6 hrs prior to adding $V_2O_5$. The vanadium is added as described in Comparative Example 1, and the results are below in Table 4.

TABLE 4

Results form Example 9

| Sample | IEP (pH) | Conversion at 270° C. (%) | k*tau |
|---|---|---|---|
| Comparative Example 1 (Average) | 4.1 +/− 0.25 | 39.8 | 0.511 |
| Example 9 | 3.51 | 55.8 | 0.817 |

Example 10

Vanadium Free Catalysts

An improvement in performance is apparent even in the absence of vanadium. This can be shown by measuring the DeNOx activity of the sample in Comparative Example 1 tested prior to vanadium addition, which is called Comparative Example 10a. This result is then compared to Example 10b, which is the powder of Example 1 prior to vanadium addition. The results are shown in Table 5 below.

TABLE 5

| Sample | IEP (pH) | Conversion 270° C. (%) | k*tau at 270° C. | Conversion 320° C. (%) | k*tau 320° C. |
|---|---|---|---|---|---|
| Comparative Example 10 a | 4.1 +/− 0.25 | 0.5 | 0.005 | 19.9 | 0.221 |
| Example 10b | <2 | 20.3 | 0.227 | 49.4 | 0.682 |

Example 11

The effect of Increased Sulfate Loading Using Isoelectric Point Determinations Via Electroacoustic Measurements The anatase titania used in these applications generally has a residual sulfate concentration related to its method of manufacture. The residual sulfate can affect the surface isoelectric point, and thus the final activity of the catalyst. This becomes apparent when the concentration of anatase in the slurry increases to the point where the sulfate concentration changes the nature and charge of the surface. It is difficult to measure this with light scattering techniques, as those done in previously discussed Malvern Zetasizer measurements. Due to the necessity of light penetration in the Zetasizer measurements, one must measure very dilute slurry concentrations approaching 0% levels. For this reason a second method was used to measure powder isoelectric point at slurry concentration levels closer to those used in catalyst preparation. The alternative method for these purposes involves the measurement of an acoustic wave generated by the motion of particles in a high frequency electric field. The nature of the oscillations and the resultant acoustic wave is related to the surface charge on the particles. We have made these measurements using the AcoustoSizer II made by Colloidal Dynamics on 10% solid slurries.

TABLE 6

Results form Example 11 showing the effect of sulfate concentration in isoelectric point and catalyst activity.

| Sample | Sulfate Concentration (%) | IEP at 0% Slurry Concentration (pH) | IEP at 10% Slurry Concentration (pH) | Conversion 270° C. (%) | k*tau 270° C. |
|---|---|---|---|---|---|
| Example 11a | 0.4 | 3.92 | 2.75 | 61.6 | 0.957 |
| Example 11b | 3.3 | 4.77 | 1.08 | 77.2 | 1.48 |

Examples 11a and 11b were prepared via a similar production method that allowed the sulfate level to vary from 0.4 wt. % to 3.3 wt. % as shown in Table 6. The isoelectric point at 0% slurry concentration was made using the Malvern Zetasizer, and the measurements place the isoelectric point of Example 11a below that or 11b. However, the measurements made on the 10% slurry by the AcoustoSizer II show that the isoelectric point decreases as the slurry concentration increases, and the decrease in isoelectric point is greatest for Example 11b due to its higher sulfate concentration.

The vanadium oxide was added as described in Comparative Example 1, and the subsequent activity measurements show that the activity increases with decreasing isoelectric point as measured at higher slurry concentrations, which are more typical of those used in catalyst preparation.

Example 12

The Effect of Zirconium Oxide Addition to Anatase Titania

It has been shown that zirconium oxide incorporation into an anatase titanium dioxide matrix will stabilize the stricture against surface area loss due to thermal sinterint. Therefore, it is beneficial to prepare a catalyst using an anatase material that includes an amount of added zirconium oxide. For this reason, two samples were prepared with 10% and 20% zirconium oxide incorporated into the titanium oxide lattice via a co-precipitation method. X-ray diffraction shows that the crystalline structure of anatase is preserved. The 10 wt. % $WO_3$ on $TiO_2$ sample was prepared in the same manner as that described in Example 1. Vanadium oxide is added to this sample in the same manner as that described in Comparative Example 1. The results of the activity test and surface area measurements are shown in Table 7. these show that the activity is improved compared to the results of Comparative Example 1 as well as the higher surface area obtained by increasing zirconium concentration in the lattice. By comparison, the average surface area of samples described in Comparative Example 1 is 44 $m^2/g$. The surface area measurements were performed by nitrogen adsorption.

TABLE 7

Results from Example 12 showing the effect of added zirconium to the anatase titania lattice.

| Sample | Zirconium Concentration (wt. %) | Surface Area ($m^2/g$) | Conversion at 270° C. (%) | k*tau |
|---|---|---|---|---|
| Example 12a | 10 | 57.1 | 54.46 | 0.787 |
| Example 12b | 20 | 72.9 | 51.38 | 0.721 |

While the present invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

What is claimed:

1. A method for treating noxious substances, said method comprising exposing nitrogen oxides to a catalyst comprised of titanium oxide, vanadium oxide and a supported metal oxide, wherein said supported metal oxide is an oxide of tungsten, molybdenum, chromium, scandium, yttrium, lanthanum, zirconium, hafnium, niobium, tantalum, iron, ruthenium, and manganese or mixtures thereof; said supported metal oxide is supported on said titanium oxide thereby forming a titania supported metal oxide; said catalyst is formed by depositing said vanadium oxide on said titania supported metal oxide; and said titania supported metal oxide has an isoelectric point of less than or equal to pH of 3.75 prior to said depositing.

2. The method of claim 1 wherein the isoelectric point of said titania supported metal oxide is less than or equal to 2.75.

3. The catalyst of claim 1 wherein said titanium oxide is comprised of anatase titanium dioxide.

4. The catalyst of claim 1 wherein said supported metal oxide comprises an oxide of tungsten.

* * * * *

UNITED STATES PATENT AND TRADEMARK OFFICE
CERTIFICATE OF CORRECTION

PATENT NO. : 7,628,968 B2 Page 1 of 1
APPLICATION NO. : 12/126653
DATED : December 8, 2009
INVENTOR(S) : Steven M. Augustine and Guoyi Fu It is certified that error appears in the above-identified patent and that said Letters Patent is hereby corrected as shown below:

Column 14, line 18: Delete "stricture" and replace with -- structure --

Column 14, line 19: Delete "sinterint." and replace with -- sintering. --

Column 14, line 30: After "Table 7." delete "these" and replace with -- These --

Signed and Sealed this

Second Day of March, 2010

David J. Kappos
*Director of the United States Patent and Trademark Office*